US010437759B2

(12) United States Patent
Goyal

(10) Patent No.: US 10,437,759 B2
(45) Date of Patent: Oct. 8, 2019

(54) NETWORKED DEVICE CONNECTION MANAGEMENT

(71) Applicant: Microsemi Solutions (U.S.) Inc., Aliso Viejo, CA (US)

(72) Inventor: Sanjay Goyal, Roseville, CA (US)

(73) Assignee: MICROSEMI SOLUTIONS (US) INC., Aliso Viejo, CA (US)

( * ) Notice: Subject to any disclaimer, the term of this patent is extended or adjusted under 35 U.S.C. 154(b) by 0 days.

(21) Appl. No.: 15/915,084

(22) Filed: Mar. 8, 2018

(65) Prior Publication Data
US 2018/0267917 A1  Sep. 20, 2018

Related U.S. Application Data

(60) Provisional application No. 62/471,996, filed on Mar. 16, 2017.

(51) Int. Cl.
*G06F 13/26* (2006.01)
*G06F 13/372* (2006.01)
*G06F 13/42* (2006.01)
*G06F 13/40* (2006.01)

(52) U.S. Cl.
CPC ........ *G06F 13/372* (2013.01); *G06F 13/4022* (2013.01); *G06F 13/4282* (2013.01); *G06F 2213/0028* (2013.01)

(58) Field of Classification Search
None
See application file for complete search history.

(56) References Cited

U.S. PATENT DOCUMENTS

| 6,088,751 | A | * | 7/2000 | Jaramillo | G06F 13/364 710/116 |
| 7,584,319 | B1 | * | 9/2009 | Liao | G06F 13/4022 370/357 |
| 2003/0083095 | A1 | * | 5/2003 | Liang | H04W 72/1215 455/552.1 |
| 2010/0057840 | A1 | * | 3/2010 | Schlusser | H04L 29/08846 709/203 |

(Continued)

OTHER PUBLICATIONS

American National Standard Working Draft T10/BSR INCITS 538 Revision 10 Published Sep. 15, 2016 by INCITS, Washington, D.C.

*Primary Examiner* — Hyun Nam
(74) *Attorney, Agent, or Firm* — Glass and Associates; Kenneth Glass

(57) ABSTRACT

A connection management method for a plurality of networked devices, the method constituted of: assigning a priority value to each of the devices, the priority value representing a priority level associated with the respective device; receiving a plurality of connection requests, each of the connection requests being associated with a respective one of the plurality of devices; for each of the received connection requests, tracking the amount of time the respective device has been waiting for connection; for each of the received connection requests, assigning an arbitration wait time value representing the tracked amount of time; responsive to the assigned priority values and the assigned arbitration wait time values, connecting the device associated with one of the received connection requests to an expander port; and responsive to the connection, adjusting the respective priority value assigned to the connected device.

13 Claims, 3 Drawing Sheets

(56) References Cited

U.S. PATENT DOCUMENTS

2011/0270959 A1* 11/2011 Schlusser ............... H04L 67/10
                                                        709/223
2012/0239873 A1*  9/2012 Huang ................ G06F 13/1626
                                                        711/105
2014/0244875 A1*  8/2014 More .................... G06F 13/372
                                                        710/116

* cited by examiner

| | |
|---|---|
| 1000 | RECEIVE CONNECTION REQUESTS FROM DEVICES 80A, 80B, 80C AND 80D |
| 1010 | RETRIEVE RTPC VALUES |
| 1020 | CONNECT DEVICE 80A |
| 1030 | UPDATE AWT OF 80B, 80C AND 80D, AND UPDATE RTPC OF 80A |
| 1040 | CONNECT DEVICE 80B |
| 1050 | UPDATE AWT OF 80A, 80C AND 80D, AND UPDATE RTPC OF 80B |
| 1060 | CONNECT DEVICE 80A |
| 1070 | UPDATE AWT OF 80B, 80C AND 80D, AND UPDATE RTPC OF 80A |
| 1080 | CONNECT DEVICE 80D |
| 1090 | UPDATE AWT OF 80A, 80B AND 80C, AND RESET RTPC OF 80D |
| 1100 | CONNECT DEVICE 80C |
| 1110 | UPDATE AWT OF 80A, 80B AND 80D, AND RESET RTPC OF 80C |
| 1120 | CONNECT DEVICE 80B |
| 1130 | UPDATE AWT OF 80A, 80C AND 80D, AND UPDATE RTPC OF 80B |
| 1140 | CONNECT DEVICE 80B |
| 1150 | UPDATE AWT OF 80A, 80C AND 80D, AND UPDATE RTPC OF 80A |
| 1160 | CONNECT DEVICE 80A |
| 1170 | UPDATE AWT OF 80B, 80C AND 80D, AND UPDATE RTPC OF 80A |
| 1180 | CONNECT DEVICE 80A |
| 1190 | UPDATE AWT OF 80B, 80C AND 80D, AND UPDATE RTPC OF 80A |
| 1200 | CONNECT DEVICE 80A |
| 1210 | UPDATE AWT OF 80B, 80C AND 80D, AND UPDATE RTPC OF 80A |

FIG. 1C

NETWORKED DEVICE CONNECTION MANAGEMENT

TECHNICAL FIELD OF THE INVENTION

The invention relates generally to the field of serial attached small computer system interfaces (SAS) and in particular to a system and method for providing SAS target priority.

BACKGROUND OF THE INVENTION

SAS is a connection-oriented protocol that allows small computer system interface (SCSI) devices, such as servers and disk drives, to communicate through a network of high-speed serial physical interconnects. Connections among the host devices, e.g. host bus adapters (HBAs), and target hard disk drives (HDDs) are managed by intermediate devices called SAS expanders. The SAS expanders act as connection management agents, much like a switch element, having physical connections to multiple host devices or disk drives simultaneously.

Multiple SAS end devices and SAS expanders can be connected together to form a SAS topology. There can be one or multiple physical links connecting each pair of neighboring devices. When there is a single physical layer (PHY) between two devices, the associated PHY on the SAS device is called a narrow port whose physical link has a dedicated SAS Address. When there are multiple PHYs connecting two devices, the associated PHYs on an expander are considered to be a single wide port as all the associated PHYs are using the same dedicated SAS Address. The term PHY as used herein refers to the circuitry required to implement physical layer function of the open system interconnection (OSI) model.

Each SAS end device, SAS expander, and HBA has a unique dedicated SAS Address. The connection between an SAS end devices to an SAS expander or HBA is a narrow port connection whereas the connection between multiple SAS expanders or between an SAS expander and an HBA can be a narrow port connection, i.e. one physical link or a single wide port connection, i.e. multiple physical links.

The SAS protocol adopts a point-to-point connection mechanism. The SAS end device and HBA communicate with each other through a connection request. The connection request from an HBA or SAS end device flows through a single SAS expander or multiple SAS expanders to reach the SAS end device or HBA. The SAS expander performs a point-to-point connection in order to route the connection request from the source PHY to the target PHY. The communication link is considered set up when a connection request from the SAS end device is accepted by the HBA, or a connection request from the HBA is accepted by the SAS end device. At this point, information can be transferred between the HBA and the SAS end device.

The connection requests from multiple SAS end devices or HBAs can reach the SAS expander device at the same time. The SAS expander has to resolve multiple connection requests targeted for different destination PHYs at the same time by connecting the request source PHY to the target PHY one at a time according to the request priority. When there are multiple source PHYs requesting to be connected to the same target PHY, an arbitration process is required to resolve the connection priority.

The SAS expander supports the least-recently used arbitration fairness as defined in the SAS protocol such that the longer the connection request has been waiting, the greater the chance that the request will win the arbitration. The arbitration priority comprises three parameters: the arbitration wait time (AWT), the source PHY SAS address, and the connection rate (CONNRATE). The AWT indicates the amount of time the source PHY has been waiting for connection to the destination PHY. An expander connection manager (ECM) reads the AWT, SAS address and CONNRATE when performing the arbitration. If two source PHYs that are queuing for the same target PHY have the same AWT, the ECM looks at the SAS address of the source PHYs. The source PHY that has the largest SAS address wins the arbitration. If both source PHYs have the same AWT and SAS address, the source PHY that has the highest CONNRATE wins the arbitration. In the event that the AWT, SAS address and CONNRATE are the same, the ECM arbitrarily picks one of the source PHYs to be connected to the target PHY.

Disadvantageously, depending solely on AWT to decide which source PHY is connected cannot provide a successful quality of service (QoS) scheme because many times some devices are deemed more important than other devices and should receive a higher priority for connection even if their AWT is shorter than less important devices. In particular, some SAS devices may have a higher average response time than others for I/O requests, and those SAS devices should preferably be allowed a higher probability of winning the connection, irrespective of AWT, albeit without starving other SAS device with a lower average response time.

U.S. patent application publication US 2014/0244875, published Aug. 28, 2014 to More et al., the entire contents of which are incorporated herein by reference, teaches a method of SAS device connection according to assigned priorities. Specifically, a priority field is added to each connection request and a priority value is assigned to each source PHY, i.e. to each SAS device. When multiple source PHYs request connection to the same target PHY, the ECM determines the priority level of each source PHY. The source PHY with the highest priority is connected to the target PHY first and a source PHY with a lower priority is connected to the target PHY second. In the event that multiple source PHYs exhibit the same priority level, the connection will be awarded to the source PHY with the longest AWT.

Unfortunately, always connecting the lower priority source PHY after the higher priority source PHY has completed its data transfer may not be desired because it does not provide for differential connection rates. Additionally, no method is described for how the ECM is able to connect the lower priority source PHY if the higher priority source PHY again requests connection.

SUMMARY OF THE INVENTION

Accordingly, it is a principal object of the present invention to overcome disadvantages of prior art methods and arrangements of serial connection of networked devices. This is provided in the present disclosure by a connection management method for a plurality of networked devices, the method comprising: assigning a priority value to each of the devices, the priority value representing a priority level associated with the respective device; receiving a plurality of connection requests, each of the connection requests being associated with a respective one of the plurality of devices; for each of the received connection requests, tracking the amount of time the respective device has been waiting for connection; for each of the received connection requests, assigning an arbitration wait time value responsive to the tracked amount of time; responsive to the assigned priority value and the assigned arbitration wait time value, connecting the device associated with one of the received connection requests to an initiator port; and responsive to the connection, adjusting the priority value assigned to the connected device.

In one independent embodiment, an SAS expander is provided, the expander comprising: a plurality of first expander ports, each of the plurality of first expander ports comprising a physical layer and a link layer, the physical layer in communication with a respective one of a plurality of networked devices; a resolver having stored thereon a plurality of priority values, each representing a priority level associated with a respective one of the plurality of devices; an expander connection manager; and a second expander port, wherein, for each of a plurality of connection requests, each received at the respective physical layer from a respective one of the plurality of devices, the respective link layer is arranged to: retrieve from the resolver the priority value assigned to the respective device; track the amount of time the respective device has been waiting for connection; assign an arbitration wait time value representing the tracked amount of time; and transmit to the expander connection manager the connection request, the retrieved priority value and the assigned arbitration wait time value, wherein the expander connection manager is arranged, responsive to the transmitted priority values and arbitration wait time values, to allow connection for the device associated with one of the transmitted connection requests to the second expander port, and wherein responsive to the connection, the resolver is arranged to adjust the respective priority value assigned to the connected device.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1C illustrates a high level flow chart of a non-limiting example of the operation of the SAS expander of FIG. 1A.

DETAILED DESCRIPTION OF THE PREFERRED EMBODIMENTS

Figure 1A:
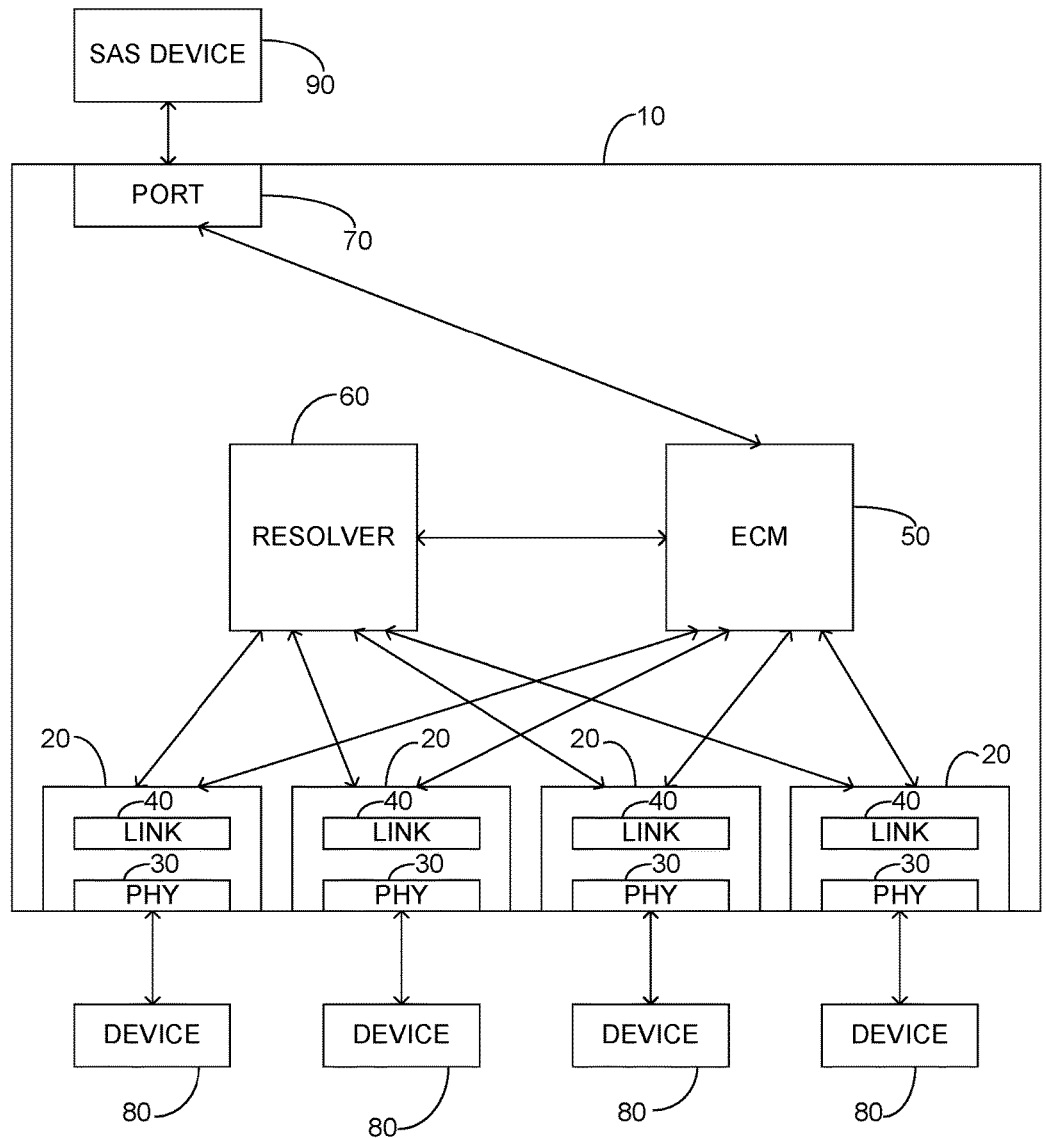
FIG. 1A illustrates a high level schematic diagram of an SAS expander, in accordance with certain embodiments.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1A illustrates a high level schematic diagram of an SAS expander 10, in accordance with certain embodiments. SAS expander 10 comprises: a plurality of expander ports 20, each comprising a PHY 30 and a link layer 40; an ECM 50; a resolver 60; and an expander port 70. A plurality of SAS devices 80 are each in communication with a PHY 30 of a respective expander port 20 via a respective device port (not shown), such as a serial ATA port. An SAS device 90 is in communication with expander port 70. SAS device 90 is any one of a SAS initiator device, and an expander port of an additional expander (not shown). A single expander port 70 is illustrated, however this is not meant to be limiting in any way. In another embodiment (not shown), a plurality of expander ports 70 are provided, each in communication with a respective SAS device 90. ECM 50 is in communication with each expander port 20, with resolver 60 and with expander port 70.

In operation, a request is received from one or more SAS devices 80 to connect to SAS device 90, the request comprising the address of the respective SAS device 80. Each connection request is received at PHY 30 of the respective expander port 20. The respective link layer 40 is arranged to retrieve the connection request and track the amount of time from the initial connection request until connection with expander port 70 is allowed. Resolver 60 has stored thereon data regarding the priority level of each SAS device 80 and link layer 40 requests, from resolver 60, a priority value representing the priority level associated with the respective SAS address. In one embodiment, a higher priority value represents a higher priority level. Resolver 60 provides link layer 40 with the requested priority value, the provided priority value denoted herein 'running target priority class' (RTPC). Resolver 60 has stored thereon an additional priority value for the SAS address, denoted 'default priority class' (DTPC). Initially, the value of RTPC is equal to the value of DTPC, as will be described below. In the embodiment where a plurality of expander ports 70 are provided, resolver 60 further indicates to link layer 40 which expander port 70 SAS device 80 is to be connected to.

Figure 1B:
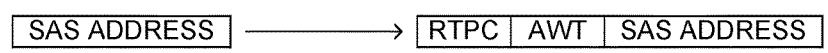
FIG. 1B illustrates an adjustment of an SAS connection request, in accordance with certain embodiments.

Link layer 40 combines with the received connection request the determined AWT value, i.e. the tracked amount of time which the respective SAS device 80 has been waiting for connection, and the received RTPC value to create an adjusted connection request. In one embodiment, as illustrated in FIG. 1B, the AWT value is added such that the bits of the AWT value are more significant in relation to the SAS address and the RTPC value is added such that the bits of the RTPC value are more significant in relation to the AWT value. The method of operation is described herein in an embodiment where a higher RTPC value represents a higher priority level and a higher AWT value represents a longer wait time, however this is not meant to be limiting in any way, and inverse values may be utilized without exceeding the scope. Each link layer 40 sends the adjusted connection request to ECM 50 and ECM 50 arbitrates between received adjusted connection requests to determine which SAS device 80 is allowed connection to expander port 70. In the embodiment where a plurality of expander ports 70 are provided, ECM 50 retrieves from resolver 60 the target expander port 70 of each SAS device 80 and arbitrates between received adjusted connection requests who are requesting connection to the same expander port 70.

ECM 50 arbitrates between different adjusted connection requests by comparing the RTPC values with each other and determining which connection request exhibits the highest RTPC value. The connection request exhibiting the highest RTPC value is allowed and the respective link layer 40 connects the associated SAS device 80 to SAS device 90 via expander port 70. In the event that more than one connection request exhibits the highest RTPC value, ECM 50 determines which of those connection requests exhibits the highest AWT value and connection is allowed for that connection request. In one embodiment, ECM 50 arbitrates between the connection requests by comparing the values of the combination of the bits of the RTPC value and the AWT value, i.e. the adjusted connection request, and selecting the highest value. In summary, SAS devices 80 are connected in accordance with their assigned priority level, however SAS devices 80 with the same priority level are connected in accordance with their connection wait time.

In order to avoid starving the lower priority SAS devices 80 from connection, after connection is allowed for a particular SAS device 80 the respective link layer 40 requests from resolver 60 an update of the respective RTPC value. Resolver 60 checks to see if the RTPC value equals the lowest possible priority value, e.g. 0. In the event that the RTPC value does not equal the lowest possible value, resolver 60 reduces the RTPC value such that the associated SAS device 80 will now receive lower priority in the arbitration done by ECM 50. In the event that the RTPC value equals the lowest possible value, resolver 60 sets the RTPC value to the value of DTPC, i.e. the initial priority level assigned to the respective SAS device 80. Link layer 40 retrieves the updated RTPC value and adds it to the next connection request, as described above. The priority value of each SAS device 80 is thus reduced after successful connection, thereby allowing connection for all of the SAS devices 80, regardless of their assigned priority level, however an SAS device 80 assigned a higher priority level will be connected more often than an SAS device 80 with a lower priority level, as reflected by the differences in the priority levels.

FIG. 1C illustrates a high level flow chart describing a non-limiting example of the operation of expander 10 and tables 1-11 detail the RTPC and AWT values for each SAS device 80 during each stage, SAS devices 80 denoted in this example as 80A, 80B, 80C and 80D, respectively. In this example, the allowable values for DTPC and RTPC range from 0 to 2 and the AWT values begin from 0 and are increased by one each time connection has been denied. The AWT value of SAS device 80D begins at 1 to illustrate an example where SAS device 80D has already been waiting for connection. The DTPC value for SAS device 80A equals 2, the DTPC value for SAS device 80B equals 1 and the DTPC values for each of SAS devices 80C and 80D equal 0.

In stage 1000, expander ports 20 each receive a connection request from the respective one of SAS devices 80A, 80B, 80C and 80D. In stage 1010, link layer 40 of each expander port 20 retrieves the respective RTPC value, as in table 1:

TABLE 1

| DEVICE | RTPC | AWT |
|--------|------|-----|
| 80A    | 2    | 0   |
| 80B    | 1    | 0   |
| 80C    | 0    | 0   |
| 80D    | 0    | 1   |

In stage 1020, each link layer 40 attaches the respective RTPC value to the respective AWT value to create the respective adjusted connection request and ECM 50 allows connection for SAS device 80A since the adjusted connection request has the highest RTPC value. In stage 1030, link layers 40 associated with SAS devices 80B, 80C and 80D update the respective AWT value and the link layer 40 associated with SAS device 80A requests from resolver 60 an update for the respective RTPC value for SAS device 80A, which has just won the arbitration. Resolver 60 updates the RTPC value for SAS device 80A to 1, as in table 2:

TABLE 2

| DEVICE | RTPC | AWT |
|--------|------|-----|
| 80A    | 1    | 0   |
| 80B    | 1    | 1   |
| 80C    | 0    | 1   |
| 80D    | 0    | 2   |

In stage 1040, connection requests are maintained by each of SAS devices 80A, 80B, 80C and 80D, and each link layer 40 attaches the respective RTPC value and the respective AWT value to the respective connection request to create the respective adjusted connection request. Although both SAS devices 80A and 80B now have an RTPC value of 1, the AWT value of SAS device 80B is greater than the AWT value of SAS device 80A, therefore ECM 50 allows connection for SAS device 80B. In stage 1050, link layers 40 associated with SAS devices 80A, 80C and 80D update the respective AWT value and the link layer 40 associated with SAS device 80B requests from resolver 60 an update for the respective RTPC value for SAS device 80B, which has just won the arbitration. Resolver 60 updates the RTPC value for SAS device 80B to 0, as in table 3:

TABLE 3

| DEVICE | RTPC | AWT |
|--------|------|-----|
| 80A    | 1    | 1   |
| 80B    | 0    | 0   |
| 80C    | 0    | 2   |
| 80D    | 0    | 3   |

In stage 1060, connection requests are maintained by each of SAS devices 80A, 80B, 80C and 80D, and each link layer 40 attaches the respective RTPC value and the respective AWT value to the respective connection request to create the respective adjusted connection request. ECM 50 allows connection for SAS device 80A since it has the highest RTPC value. In stage 1070, link layers 40 associated with SAS devices 80B, 80C and 80D update the respective AWT value and the link layer 40 associated with SAS device 80A requests from resolver 60 an update for the respective RTPC value for SAS device 80A, which has just won the arbitration. Resolver 60 updates the RTPC value for SAS device 80A to 0, as in table 4:

TABLE 4

| DEVICE | RTPC | AWT |
|---|---|---|
| 80A | 0 | 0 |
| 80B | 0 | 1 |
| 80C | 0 | 3 |
| 80D | 0 | 4 |

In stage 1080, connection requests are maintained by each of SAS devices 80A, 80B, 80C and 80D, and each link layer 40 attaches the respective RTPC value and the respective AWT value to the respective connection request to create the respective adjusted connection request. The RTCP value of each of devices 80A, 80B, 80C and 80D are equal to 0, therefore ECM 50 allows connection for SAS device 80D since it has the highest AWT value. In stage 1090, link layers 40 associated with SAS devices 80A, 80B and 80C update the respective AWT value and the link layer 40 associated with SAS device 80D requests from resolver 60 an update for the respective RTPC value for SAS device 80D, which has just won the arbitration. Resolver 60 determines that the RTPC value equals 0 and thus resets the RTPC value for SAS device 80D to the value in the respective DTPC value which is also 0, as in table 5:

TABLE 5

| DEVICE | RTPC | AWT |
|---|---|---|
| 80A | 0 | 1 |
| 80B | 0 | 2 |
| 80C | 0 | 4 |
| 80D | 0 | 0 |

In stage 1100, connection requests are maintained by each of SAS devices 80A, 80B, 80C and 80D, and each link layer 40 attaches the respective RTPC value and the respective AWT value to the respective connection request to create the respective adjusted connection request. Although the RTCP value of each of devices 80A, 80B, 80C and 80D are equal to 0, ECM 50 allows connection for SAS device 80C since it has the highest AWT value. In stage 1110, link layers 40 associated with SAS devices 80A, 80B and 80D update the respective AWT value and the link layer 40 associated with SAS device 80C requests from resolver 60 an update for the respective RTPC value for SAS device 80C, which has just won the arbitration. Resolver 60 determines that the RTPC value for SAS device 80C equals 0 and thus resets the RTPC value for SAS device 80C to the value in the respective DTPC value which is also 0, as in table 6:

TABLE 6

| DEVICE | RTPC | AWT |
|---|---|---|
| 80A | 0 | 2 |
| 80B | 0 | 3 |
| 80C | 0 | 0 |
| 80D | 0 | 1 |

In stage 1120, connection requests are maintained by each of SAS devices 80A, 80B, 80C and 80D, and each link layer 40 attaches the respective RTPC value and the respective AWT value to the respective connection request to create the respective adjusted connection request. Although the RTCP value of each of devices 80A, 80B, 80C and 80D are equal to 0, ECM 50 allows connection for SAS device 80B since it has the highest AWT value. In stage 1130, link layers 40 associated with SAS devices 80A, 80C and 80D update the respective AWT value and the link layer 40 associated with SAS device 80B requests from resolver 60 an update for the respective RTPC value for SAS device 80B, which has just won the arbitration. Resolver 60 determines that the RTPC value for SAS device 80B equals 0 and thus resets the RTPC value for SAS device 80B to the value in the respective DTPC value which is 1, as in table 7:

TABLE 7

| DEVICE | RTPC | AWT |
|---|---|---|
| 80A | 0 | 3 |
| 80B | 1 | 0 |
| 80C | 0 | 1 |
| 80D | 0 | 2 |

In stage 1140, connection requests are maintained by each of SAS devices 80A, 80B, 80C and 80D, and each link layer 40 attaches the respective RTPC value and the respective AWT value to the respective connection request to create the respective adjusted connection request. ECM 50 allows connection for SAS device 80B since it has the highest RTPC value. In stage 1150, link layers 40 associated with SAS devices 80A, 80C and 80D update the respective AWT value and the link layer 40 associated with SAS device 80B requests from resolver 60 an update for the respective RTPC value for SAS device 80B, which has just won the arbitration. Resolver 60 updates the RTPC value for SAS device 80B to 0, as in table 8:

TABLE 8

| DEVICE | RTPC | AWT |
|---|---|---|
| 80A | 0 | 4 |
| 80B | 0 | 0 |
| 80C | 0 | 2 |
| 80D | 0 | 3 |

In stage 1160, connection requests are maintained by each of SAS devices 80A, 80B, 80C and 80D, and each link layer 40 attaches the respective RTPC value and the respective AWT value to the respective connection request to create the respective adjusted connection request. The RTCP value of each of devices 80A, 80B, 80C and 80D are equal to 0, ECM 50 allows connection for SAS device 80A since it has the highest AWT value. In stage 1170, link layers 40 associated with SAS devices 80B, 80C and 80D update the respective AWT value and the link layer 40 associated with SAS device 80A requests from resolver 60 an update for the respective RTPC value for SAS device 80A, which has just won the arbitration. Resolver 60 determines that the RTPC value for SAS device 80A equals 0 and thus resets the RTPC value for SAS device 80A to the value in the respective DTPC value which is 2, as in table 9:

TABLE 9

| DEVICE | RTPC | AWT |
|---|---|---|
| 80A | 2 | 0 |
| 80B | 0 | 1 |
| 80C | 0 | 3 |
| 80D | 0 | 4 |

In stage 1180, connection requests are maintained by each of SAS devices 80A, 80B, 80C and 80D, and each link layer 40 attaches the respective RTPC value and the respective AWT value to the respective connection request to create the respective adjusted connection request. ECM 50 allows connection for SAS device 80A since it has the highest RTCP value. In stage 1190, link layers 40 associated with SAS devices 80B, 80C and 80D update the respective AWT value and the link layer 40 associated with SAS device 80A requests from resolver 60 an update for the respective RTPC value for SAS device 80A, which has just won the arbitration. Resolver 60 updates the RTPC value for SAS device 80A to 1, as in table 10:

TABLE 10

| DEVICE | RTPC | AWT |
|---|---|---|
| 80A | 1 | 0 |
| 80B | 0 | 2 |
| 80C | 0 | 4 |
| 80D | 0 | 5 |

In stage 1200, connection requests are maintained by each of SAS devices 80A, 80B, 80C and 80D, and each link layer 40 attaches the respective RTPC value and the respective AWT value to the respective connection request to create the respective adjusted connection request. ECM 50 allows connection for SAS device 80A since it has the highest RTPC value. In stage 1210, link layers 40 associated with SAS devices 80B, 80C and 80D update the respective AWT value and the link layer 40 associated with SAS device 80A requests from resolver 60 an update for the respective RTPC value for SAS device 80A, which has just won the arbitration. Resolver 60 updates the RTPC value to 0, as in table 11:

TABLE 11

| DEVICE | RTPC | AWT |
|---|---|---|
| 80A | 0 | 0 |
| 80B | 0 | 3 |
| 80C | 0 | 5 |
| 80D | 0 | 6 |

As can be seen in table 11, the next device to be connected will be SAS device 80D, followed by SAS device 80C, followed by SAS device 80B. It can thus be seen that lower priority devices are not starved of communication, while devices with a higher priority level are connected more often than devices with a lower priority level. In the above example, for 10 connection requests:
1. SAS device 80A, assigned the highest priority level, was allowed connection 5 times;
2. SAS device 80B, assigned a medium priority level, was allowed connection 3 times; and
3. SAS devices 80C and 80D, each assigned the lowest priority level, were each allowed connection once.

Figure 2:
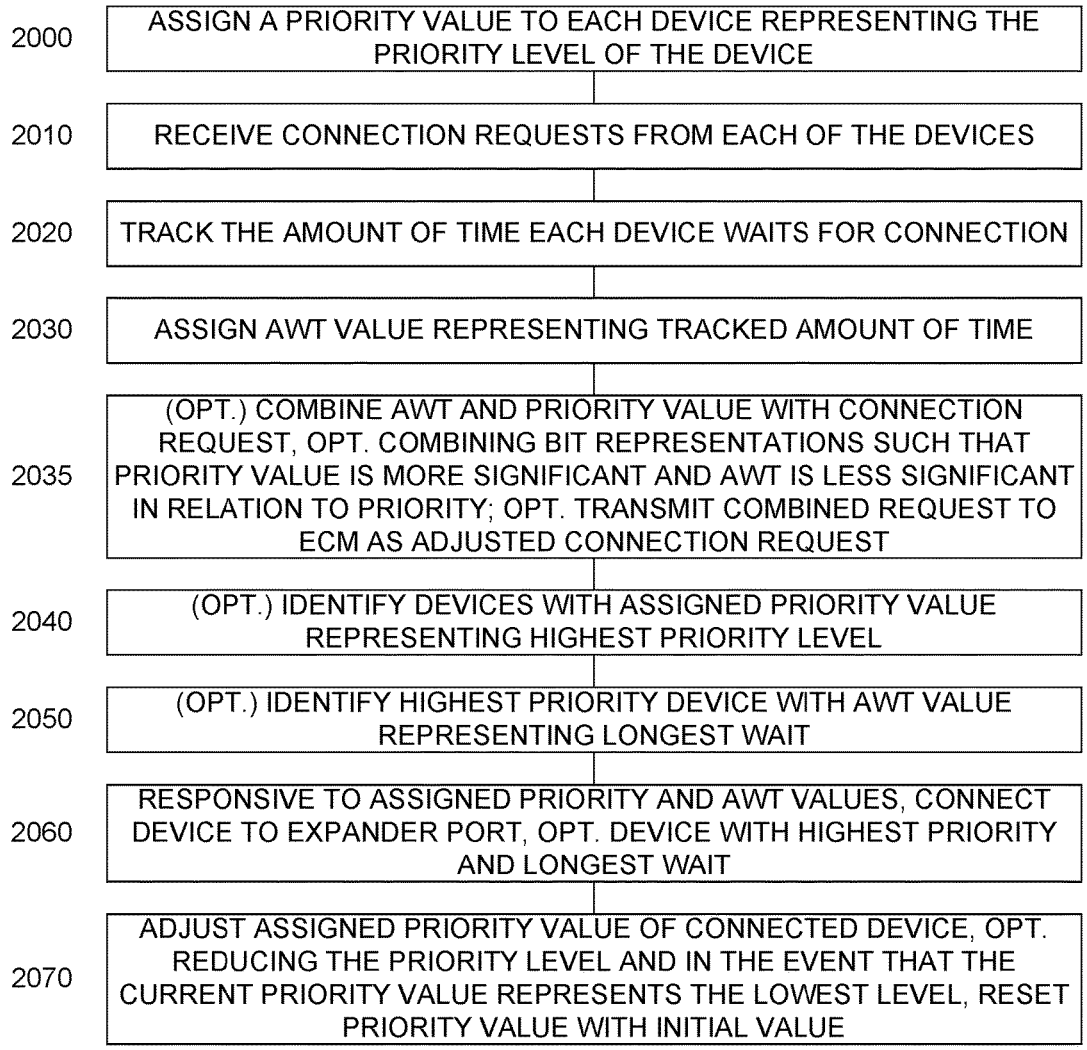
FIG. 2 illustrates a high level flow chart of a connection management method for a plurality of networked devices, in accordance with certain embodiments.

FIG. 2 illustrates a high level flow chart of a connection management method for a plurality of networked devices, in accordance with certain embodiments. In stage 2000, a priority value is assigned to each of the plurality of networked devices, the priority value representing a priority level associated with the respective device. Optionally, a higher priority value represents a higher priority level. In stage 2010, a plurality of connection requests are received, each of the received connection requests being associated with a respective one of the plurality of devices of stage 2000. In stage 2020, for each of the received connection requests of stage 2010, the amount of time the respective device has been waiting for connection is tracked. In stage 2030, for each of the received connection requests of stage 2010, an AWT value is assigned representing the tracked amount of time of stage 2020. Optionally, the AWT value increases as the tracked amount of time increases. As described above, in one alternate embodiment the AWT value can be initialized at a predetermined value and the value decreased as the tracked amount of time increases.

In optional stage 2035, each of the assigned priority and AWT values of respective stages 2000 and 2030 are combined with the respective connection request of stage 2010. Optionally, the assigned priority and AWT values are added by concatenating a bit representation of the assigned priority value and a bit representation of the assigned AWT value such that the bit representation of the assigned priority value is represented by more significant bits in relation to the bit representation of the assigned AWT value. Optionally, the combined connection request is transmitted to an ECM as an adjusted connection request.

In optional stage 2040, of the devices requesting connection to the same address, the devices which have assigned thereto a priority value which represents the highest assigned priority level are identified. In optional stage 2050, of the identified devices of optional stage 2040, the device which has assigned thereto an AWT value which represents the longest waiting time is identified. Optionally, the device is identified by identifying the adjusted connection request of optional stage 2035 with the highest value.

In stage 2060, responsive to the assigned priority values of stage 2000 and the assigned AWT values of stage 2030, the device associated with one of the received connection requests of stage 2010 is connected to an expander port. Optionally, connection is provided for the identified device of optional stage 2050. In stage 2070, responsive to the connection of stage 2060, the priority value assigned to the connected device is adjusted. Optionally, the adjustment comprises reducing the priority level of the device and in the event that the current priority value represents the lower priority level, the adjustment comprises resetting the priority value to its initial value.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

The terms "include", "comprise" and "have" and their conjugates as used herein mean "including but not necessarily limited to".

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

The invention claimed is:

1. A connection management method comprising:
   receiving connection requests from a plurality of devices;
   for each of the received connection requests assigning a priority value, wherein each assigned priority value is a numerical value representing a priority level the respective one of the plurality of devices that originated the connection request;
   for each of the received connection requests, tracking the amount of time the respective device has been waiting for connection;
   for each of the received connection requests, assigning an arbitration wait time value representing the tracked amount of time;
   arbitrating between the received connection requests using the assigned priority values and the assigned arbitration wait time values to determine a winning connection request;
   connecting the device associated with the winning connection request to an expander port;
   responsive to the connection, adjusting the respective priority value assigned to the connected device by:
      reducing the priority value assigned to the connected device when the priority value assigned to the connected device does not represent a lowest priority level; and
      resetting the priority value assigned to the connected device to an initial value when the priority value assigned to the connected device represents the lowest priority level.

2. The method of claim 1, wherein the arbitrating between the received connection requests further comprises:
   arbitrating between the received connection requests using the assigned priority values to identify one or more of the assigned priority values having a highest priority level; and
   if more than one of the assigned priority values have the highest priority level, arbitrating between the more than one of the assigned priority values using the assigned arbitration wait time values.

3. The method of claim 1, wherein the reducing comprises incrementally reducing the respective priority value by subtracting a predetermined value from the respective priority value.

4. The method of claim 1, further comprising, for each of the received connection requests, concatenating a bit representation of the assigned priority value with a bit representation of the assigned arbitration wait time value such that the assigned priority value is represented by more significant bits and the assigned arbitration wait time value is represented by less significant bits.

5. The method of claim 4, further comprising:
   for each of the received connection requests, combining the bit representations of the assigned priority value and the assigned arbitration wait time value with the received connection request to create an adjusted connection request; and
   transmitting the adjusted connection request to an expander connection manager.

6. A serial attached small computer system interface (SAS) expander comprising:
   a plurality of first expander ports, each of the plurality of first expander ports comprising a physical layer and a link layer, each of the physical layers in communication with a respective one of a plurality of networked devices;
   a resolver having stored thereon a plurality of priority values, wherein each priority value is a numerical value representing a priority level assigned to a respective one of the plurality of networked devices;
   an expander connection manager; and
   a second expander port,
   wherein, for each of a plurality of connection requests, each received at the respective physical layer from the respective one of the plurality of networked devices, the respective link layer is arranged to:
      retrieve from the resolver the priority value assigned to the respective networked device;
      track the amount of time the respective networked device has been waiting for connection;
      assign an arbitration wait time value representing the tracked amount of time; and
      transmit to the expander connection manager the connection request, the retrieved priority value and the assigned arbitration wait time value,
   wherein the expander connection manager is arranged, responsive to the transmitted priority values and arbitration wait time values, to allow connection for the respective one of the plurality of networked devices to the second expander port, and
   wherein responsive to the connection, the resolver is arranged to adjust the respective priority value assigned to the connected device by:
      reducing the priority level assigned to the connected device by reducing or increasing the stored priority value assigned to the connected networked device when the priority value assigned to the connected networked device does not represent a lowest priority level; and
      resetting the priority value assigned to the connected networked device to an initial value when the priority value assigned to the connected networked device represents the lowest priority level.

7. The expander of claim 6, wherein the expander connection manager is further arranged to:
   arbitrate using the transmitted priority values to determine a respective one of the plurality of networked devices having a highest priority level, and connect the respective one of the plurality of networked devices having the highest priority level to the second expander port; and
   if more than one of the transmitted priority values has the highest priority level, arbitrate using the arbitration wait time values to determine a respective one of the plurality of networked devices having the highest priority level and a longest waiting time, and connect the respective one of the plurality of networked devices having the highest priority level and the longest waiting time to the second expander port.

8. The expander of claim 7, wherein the reducing the priority level assigned to the connected networked device further comprises incrementally reducing or increasing the stored priority value assigned to the connected device by subtracting 1 from the stored priority value or adding 1 to the stored priority value.

9. The expander of claim 6, wherein each of the link layers is further arranged to concatenate a bit representation of the respectively assigned priority value with a bit representation of the respectively assigned arbitration wait time value such that the assigned priority value is represented by more significant bits and the assigned arbitration wait time value is represented by less significant bits.

10. A connection management method comprising:

receiving connection requests from a plurality of devices;

for each of the received connection requests assigning a priority value, wherein each assigned priority value is a numerical value representing a priority level the respective one of the plurality of devices that originated the connection request;

for each of the received connection requests, tracking the amount of time the respective device has been waiting for connection;

for each of the received connection requests, assigning an arbitration wait time value representing the tracked amount of time;

arbitrating between the received connection requests using the assigned priority values and then using the assigned arbitration wait time values to determine a winning connection request;

connecting the device associated with the winning connection request to the expander port; and responsive to the connection, adjusting the respective priority value assigned to the connected device by:

increasing the priority value assigned to the connected device when the priority value assigned to the connected device does not represent a lowest priority level; and resetting the priority value assigned to the connected device to an initial value when the priority value assigned to the connected device represents the lowest priority level.

11. The method of claim 10, wherein the arbitrating between the received connection requests further comprises:

arbitrating between the received connection requests using the assigned priority values to identify one or more of the assigned priority values having a highest priority level; and if more than one of the assigned priority values have the highest priority level, arbitrating between the more than one of the assigned priority values using the assigned arbitration wait time values.

12. The method of claim 10, wherein the increasing comprises incrementally increasing the respective priority value by adding a predetermined value to the respective priority value.

13. The method of claim 10, further comprising, for each of the received connection requests, concatenating a bit representation of the assigned priority value with a bit representation of the assigned arbitration wait time value such that the assigned priority value is represented by more significant bits and the assigned arbitration wait time value is represented by less significant bits.

* * * * *